(12) United States Patent
Takeoka et al.

(10) Patent No.: US 8,714,629 B2
(45) Date of Patent: May 6, 2014

(54) CONSTRUCTION MACHINE

(75) Inventors: Naoki Takeoka, Maibara (JP); Tomoyuki Tanaka, Yasu (JP); Shogo Kimura, Ritto (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 13/990,611

(22) PCT Filed: Jan. 6, 2012

(86) PCT No.: PCT/JP2012/050163
§ 371 (c)(1),
(2), (4) Date: May 30, 2013

(87) PCT Pub. No.: WO2012/098940
PCT Pub. Date: Jul. 26, 2012

(65) Prior Publication Data
US 2013/0285413 A1 Oct. 31, 2013

(30) Foreign Application Priority Data

Jan. 19, 2011 (JP) ................. 2011-009080

(51) Int. Cl.
*B62D 25/06* (2006.01)
(52) U.S. Cl.
USPC ................ 296/190.08; 296/190.03
(58) Field of Classification Search
CPC ........ E02F 9/16; E02F 9/163; B62D 33/0625; B62D 33/06
USPC ................ 296/190.08, 190.03, 190.01, 102; 180/89.12
See application file for complete search history.

(56) References Cited

U.S. PATENT DOCUMENTS 8,235,457 B2 * 8/2012 Yamamoto et al. ...... 296/190.03
2008/0238147 A1 10/2008 Fukudome et al.

FOREIGN PATENT DOCUMENTS

| JP | 2000-273909 A | 10/2000 |
| JP | 2006-082785 A | 3/2006 |
| JP | 2008-239091 A | 10/2008 |
| JP | 2011-247058 A | 12/2011 |
| JP | 2012-030605 A | 2/2012 |

* cited by examiner

*Primary Examiner* — Joseph Pape
(74) *Attorney, Agent, or Firm* — Mattingly & Malur, PC (57) ABSTRACT

A canopy (23) is provided to rise in an upper revolving structure (3) for covering an upper side of an operator's seat (19). A bend portion (25B) extending in the left-right direction and projecting upward is provided in a front end side of a roof plate (25) in the canopy (23). A plate-shaped left front lifting bracket (26) is provided in a left front connecting portion (24J), and a plate-shaped right front lifting bracket (27) is provided in a right front connecting portion (24L). The left and right front lifting brackets (26, 27) sandwich the bend portion (25B) from both sides in the left-right direction. Further, the left and right front lifting brackets (26, 27) are provided with lifting holes (26A, 27A) and also discharging notches (26B, 27B).

4 Claims, 10 Drawing Sheets

CONSTRUCTION MACHINE

TECHNICAL FIELD

The present invention relates to a construction machine, such as a hydraulic excavator or a wheel loader, and particularly to a construction machine equipped with a canopy for covering an operator's seat provided in a vehicle body from above.

BACKGROUND ART

In general, a hydraulic excavator as a construction machine used for an excavating operation of earth and sand is configured by an auto-motive vehicle body and a working mechanism provided in a front portion side of the vehicle body to be capable of tilting up and down. A relatively compact hydraulic excavator called a miniature excavator is regularly configured to cover an operator's seat provided in the vehicle body with a canopy to restrict rain water, snow and the like (hereinafter, called rain water) to fall on an operator who gets on the operator's seat.

This kind of canopy is configured by a left front column provided to rise in a left front side of an operator's seat, a right front column provided to rise in a right front side of the operator's seat, a left rear column provided to rise in a left rear side of the operator's seat, a right rear column provided to rise in a right rear side of the operator's seat, a left connecting beam extending in the front-rear direction to connect the left front column and the left rear column, a right connecting beam extending in the front-rear direction to connect the right front column and the right rear column, and a roof plate provided between the left connecting beam and the right connecting beam to extend in the front-rear direction for covering an upper side of the operator's seat with (Patent Document 1).

In this conventional art, a projection portion is provided in a front portion side of the roof plate forming part of the canopy to extend in the left-right direction, and is designed to block rain water, which has fallen on the roof plate from the projection portion, at the front side of the roof plate. On the other hand, a hook is provided in each of the right connecting beam and the left connecting beam to hook (engage) a lifting tool such as a wire, thus lifting the canopy with the hook.

PRIOR ART DOCUMENT

Patent Document

Patent Document 1: Japanese Patent Laid-Open No. 2006-82785 A

SUMMARY OF THE INVENTION

According to the conventional art, the projection portion of the roof plate is not provided over an entire length (entire width) of the roof plate in the left-right direction. Therefore there is a possibility that the rain water flows out from both end sides of the projection portion to the front side of the roof plate, and the flown rain water drops down at the front side of the operator's seat. For overcoming this problem, it is conceivable that the projection portion is provided in the front end side of the roof plate over the entire length (entire width) thereof in the left-right direction to suppress the rain water to drop down to the front side of the operator's seat. However, as the projection portion is simply provided over the entire length (entire width) in the left-right direction, there occurs a possibility of an increase in the number of components in use.

The present invention is made in view of a problem of the foregoing conventional art, and an object of the present invention is to provide a construction machine which can suppress rain water to drop down to a front side of an operator's seat and suppress an increase in the number of components in use.

(1) In order to solve the above-described problems, the present invention is applied to a construction machine comprising: an auto-motive vehicle body in a front portion side of which a working mechanism is provided; an operator's seat provided in the vehicle body for an operator to sit on; and a canopy provided to rise in the vehicle body to cover an upper side of the operator's seat, wherein the canopy comprises: a left front column provided to rise in a left front side of the operator's seat; a right front column provided to rise in a right front side of the operator's seat; a left rear column provided to rise in a left rear side of the operator's seat; a right rear column provided to rise in a right rear side of the operator's seat; a left connecting beam extending in the front-rear direction to connect the left front column and the left rear column; a right connecting beam extending in the front-rear direction to connect the right front column and the right rear column; and a roof plate provided between the left connecting beam and the right connecting beam to extend in the front-rear direction for covering the upper side of the operator's seat.

A characteristic of a configuration adopted by the present invention is that a bend portion is provided in a front end side of the roof plate to extend in the left-right direction and project upward between a left connecting portion connecting the left front column and the left connecting beam and a right connecting portion connecting the right front column and the right connecting beam, plate-shaped lifting brackets are respectively provided in a position of the left connecting portion and in a position of the right connecting portion to sandwich the bend portion from both sides in the left-right direction, and a discharging notch is provided in at least one of the left and right lifting brackets to a section thereof corresponding to the bend portion of the roof plate.

With this arrangement, the bend portion can block the rain water in the front end side of the roof plate. In this case, since the bend portion is sandwiched in the left-right direction by the plate-shaped lifting brackets provided with the discharging notches, the rain water blocked by the bend portion flows through the notches of the lifting brackets to the front column sides, thus making it possible to flow and drop downward along the front columns. In this way, this configuration can suppress the rain water to drop down from the front end side of the roof plate to the front side of the operator's seat. As a result, this configuration can suppress the rain water to fall down on the operator's feet at operating, and can improve working environments at raining.

Further, the plate-shaped left and right lifting brackets for sandwiching the front end side of the roof plate from both sides in the left-right direction are respectively configured to have the function of a hook for hooking a lifting tool such as a wire, a hook, a rope or the like at the time of lifting the canopy. Thereby it is not necessary to provide a bracket equipped with another component in the front end side of the roof plate, to the upper portion front side of the canopy. Therefore an increase in the number of components can be suppressed to achieve a reduction in manufacturing costs.

(2) According to the present invention, it is configured such that, an upper end of the lifting bracket projects upward more than a flat portion of the roof plate, and the notch is formed by notching the lifting bracket from the upper end thereof to the flat portion of the roof plate. With this configuration, the rain water blocked by the bend portion of the roof plate can stably flow through the respective notches of the front lifting brackets to the respective front columns.

(3) According to the present invention, it is configured such that, a bottom portion of the notch is notched to the lower side position than a top surface of the flat portion of the roof plate. With this configuration, the rain water can stably flow through the notch from the top surface of the flat portion of the roof plate to the front column side. This configuration can prevent the rain water from remaining on the top surface of the flat portion in the roof plate.

(4) According to the present invention, it is configured such that, the left lifting bracket and the right lifting bracket are provided with lifting holes for mounting a lifting tool in positions thereof closer to a front side than the bend portion, the bend portion is inclined obliquely backward to the roof plate, and an angle between the bend portion and the flat portion of the roof plate is set to be an acute angle. This configuration can prevent the lifting tool such as a wire, a hook, a rope or the like which are hooked in the lifting holes of the lifting brackets from interfering with the bend portion to stably perform the lifting work of the canopy.

MODE FOR CARRYING OUT THE INVENTION

Hereinafter, an embodiment of a construction machine according to the present invention will be in detail explained with reference to the accompanying drawings by taking a case in which the construction machine is applied to a hydraulic excavator.

Figure 1:
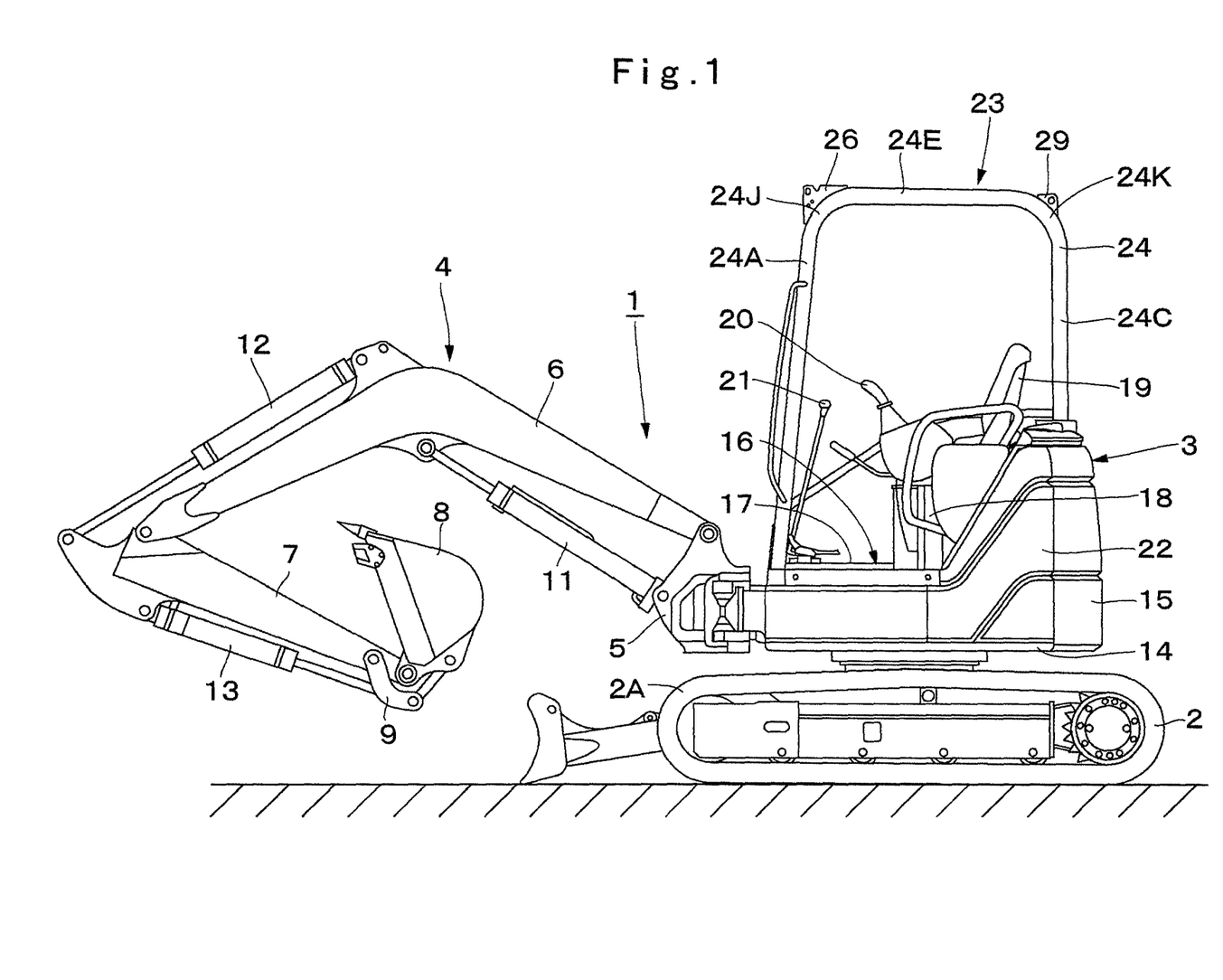
FIG. 1 is a front view showing a hydraulic excavator according to an embodiment of the present invention.
Figure 2:
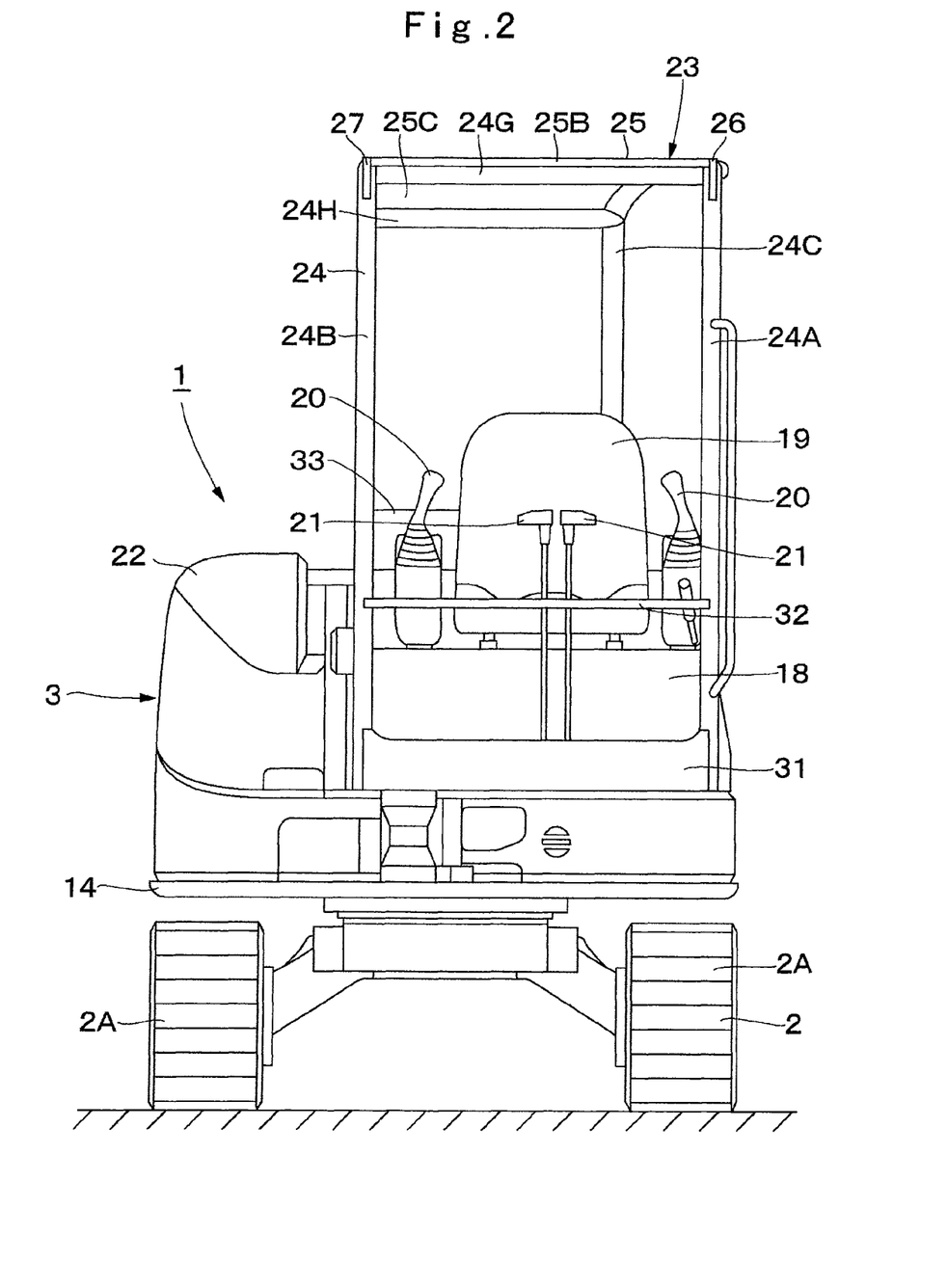
FIG. 2 is a left side view showing the hydraulic excavator in a state where the working mechanism is removed.

In FIG. 1, designated at 1 is a hydraulic excavator as a construction machine, and a vehicle body of the hydraulic excavator 1 is largely constituted by an automotive lower traveling structure 2 of an auto-motive crawler type having left and right crawlers (crawler belt) 2A, and an upper revolving structure 3 rotatably mounted on the lower traveling structure 2. A working mechanism 4 of a swing type, which will be described later, is provided in a front portion side of the upper revolving structure 3 to be capable of swinging, as well as tilting up and down.

The working mechanism 4 is provided in the front portion side of the upper revolving structure 3. The working mechanism 4 is configured by including a swing post 5 mounted to a front end side of a revolving frame 14 to be described later to be capable of swinging in the left-right direction, a boom 6 mounted to the swing post 5 to be capable of tilting up and down thereto, an arm 7 mounted to a front end portion of the boom 6 to be capable of tilting up and down thereto, a bucket 8 as a working tool rotatably mounted to a front end portion of the arm 7, and bucket links 9 provided between the arm 7 and the bucket 8.

Figure 3:
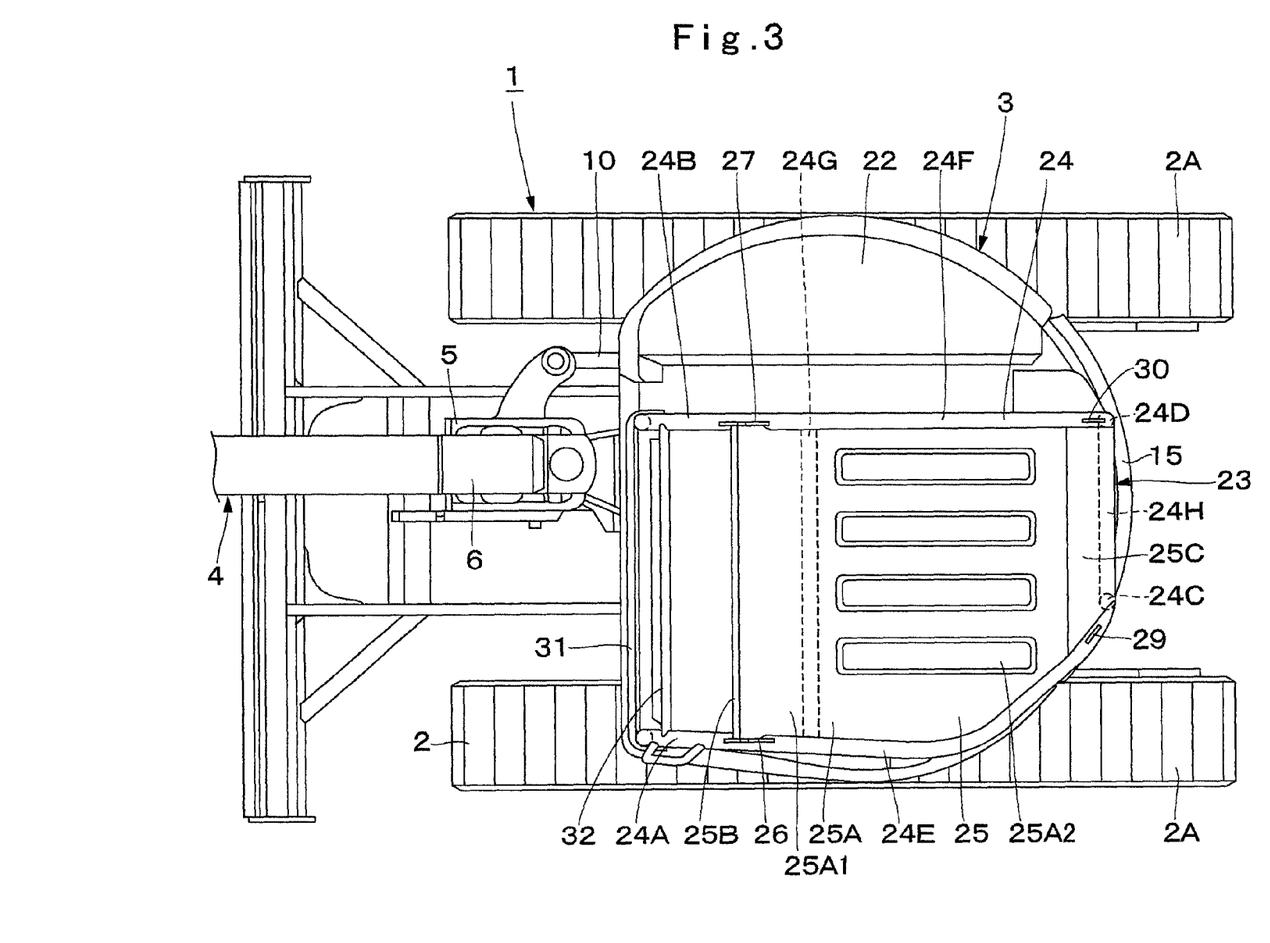
FIG. 3 is a plan view showing the hydraulic excavator.
Figure 4:
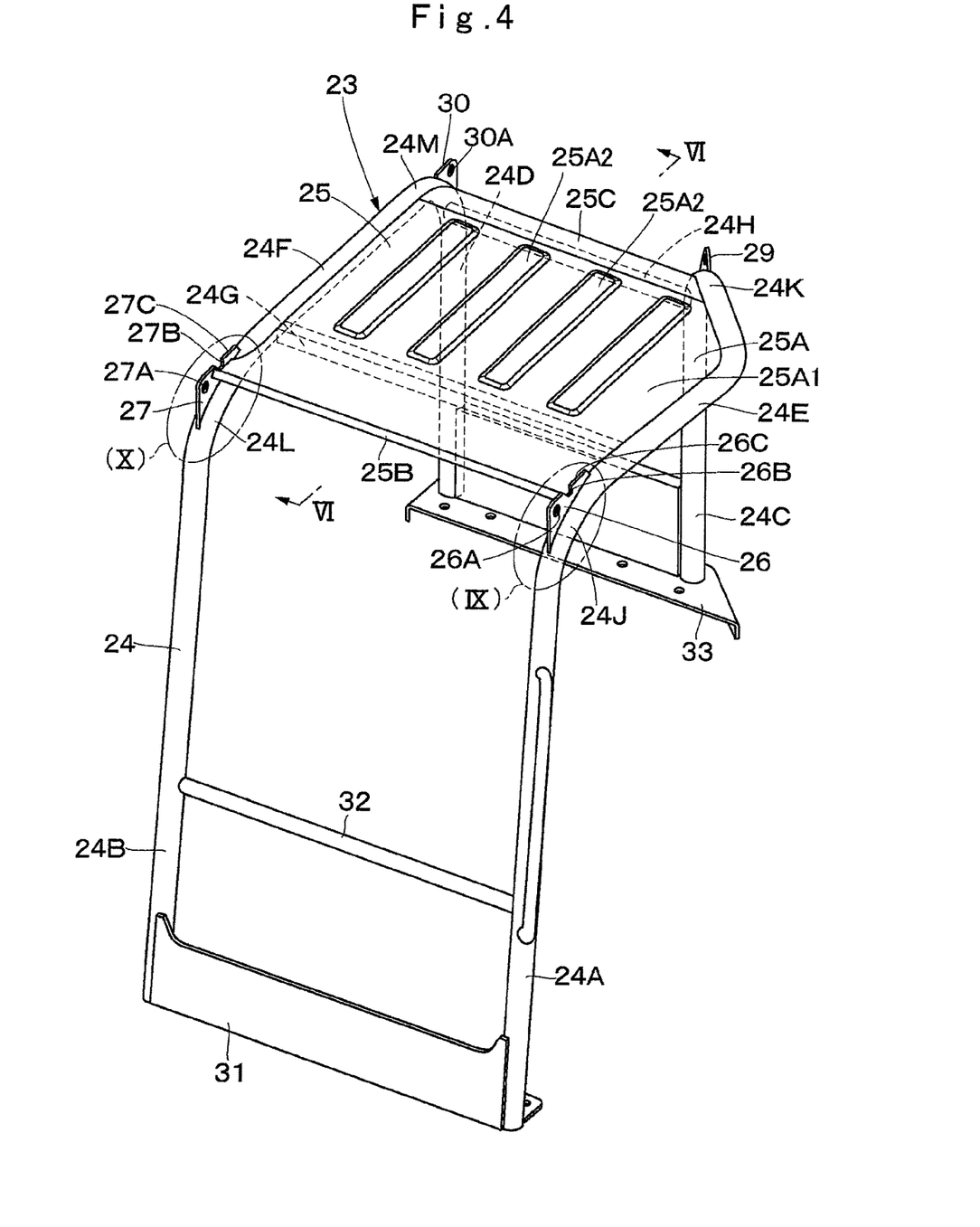
FIG. 4 is a perspective view showing a canopy as a single unit.

A swing cylinder 10 is provided between the revolving frame 14 and the swing post 5 for swinging the swing post 5 in the left-right direction (refer to FIG. 3). A boom cylinder 11 is provided between the swing post 5 and the boom 6 for tilting up and down the boom 6. An arm cylinder 12 is provided between the boom 6 and the arm 7 for tilting up and down the arm 7. A bucket cylinder 13 is provided between the arm 7 and the bucket link 9 for rotating the bucket 8 in the upper-lower direction.

Next, the upper revolving structure 3 rotatably provided on the lower traveling structure 2 thereon will be explained.

As shown in FIG. 3, the upper revolving structure 3 has a width dimension in the left-right direction substantially equal to a vehicle width of the lower traveling structure 2 (interval between the left and right crawlers 2A), and is formed in a substantially circular shape as viewed from above. As a result, the hydraulic excavator 1 is formed as a hydraulic excavator of a rearward small revolving type in which a rear end surface of a counterweight 15 to be described later is accommodated substantially within a vehicle width of the lower traveling structure 2 when the upper revolving structure 3 performs a revolving operation on the lower traveling structure 2. The upper revolving structure 3 is largely constituted by the revolving frame 14, the counterweight 15, a floor plate 16, an operator's seat 19 and a canopy 23, which will be described later, and the like.

The revolving frame 14 is formed as a base of the upper revolving structure 3, and the swing post 5 of the working mechanism 4 is swingably mounted to the front end side of the revolving frame 14 in the left-right direction. On the other hand, the counterweight 15 is fixed to the rear end side of the revolving frame 14 to act as a weight balance to the working mechanism 4. An engine, a hydraulic pump and the like (none of them are shown) are arranged in front of the counterweight 15.

The floor plate 16 is provided on the revolving frame 14. The floor plate 16 is configured by a foot rest plate 17 which is a foot rest spot of an operator on the operator's seat 19 to be described later, and an operator's seat support base 18 rising upward from a rear side of the foot rest plate 17 to support the operator's seat 19.

The operator's seat 19 is supported on the operator's seat support base 18 forming part of the floor plate 16, and the operator's seat 19 is provided for an operator steering the hydraulic excavator 1 to sit on. Working control levers 20 are arranged in both of the left and right sides of the operator's seat 19 for controlling the working mechanism 4 and the like. A traveling control lever/pedal 21 is arranged in front of the operator's seat 19 for controlling the traveling of the lower traveling structure 2.

An exterior cover 22 is provided to surround the circumference of the operator's seat 19. The exterior cover 22 covers the engine, the hydraulic pump, a heat exchanger, an operating oil tank, a fuel tank, and the like (none of them are shown) mounted on the revolving frame 14 together with the counterweight 15 and the like.

Next, the canopy 23 as an essential part of the present embodiment will be explained.

That is, designated at 23 is the canopy provided to rise surrounding the circumference of the operator's seat 19 for covering the upper side of the operator's seat 19, and the canopy 23 is designed to protect the operator on the operator's seat 19 from rain water. The canopy 23 is configured as a four-column canopy excellent in rigidity, which is formed of a column 24 and a roof plate 25, which will be described later.

Indicated at 24 is the column provided to rise to surround the operator's seat 19, and the column 24 is configured by a left front column 24A, a right front column 24B, a left rear column 24C, a right rear column 24D, a left connecting beam 24E, a right connecting beam 24F, a front connecting beam 24G and a rear connecting beam 24H. The left front column 24A is provided to rise in a left front side of the operator's seat 19, the right front column 24B is provided to rise in a right front side of the operator's seat 19, the left rear column 24C is provided to rise in a left rear side of the operator's seat 19, and the right rear column 24D is provided to rise in a right rear side of the operator's seat 19. On the other hand, the left connecting beam 24E extends in the front-rear direction to connect the left front column 24A and the left rear column 24C, the right connecting beam 24F extends in the front-rear direction to connect the right front column 24B and the right rear column 24D, the front connecting beam 24G extends in the left-right direction to connect the left connecting beam 24E and the right connecting beam 24F, and the rear connecting beam 24H extends in the left-right direction to connect the left rear column 24C and the right rear column 24D.

Figure 5:
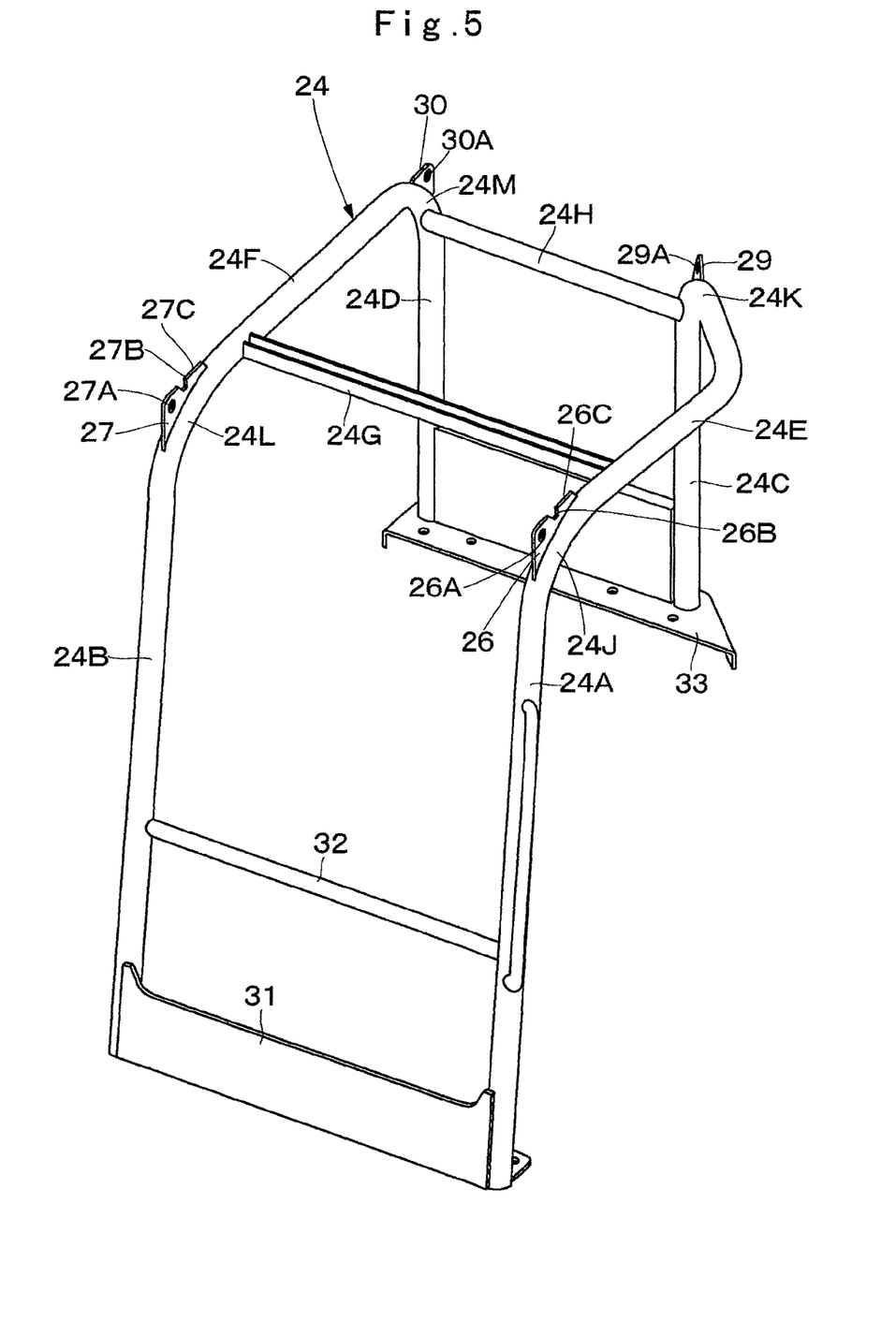
FIG. 5 is a perspective view showing the canopy in a state where a roof plate is removed.

As shown in FIG. 5, the left front column 24A, the left connecting beam 24E and the left rear column 24C are formed integrally by performing bending work to, for example, a single cylindrical steel pipe or the like. Therefore, the left front column 24A and the left connecting beam 24E are smoothly connected through a left front connecting portion 24J as a left connecting portion curved in an arc shape, and the left connecting beam 24E and the left rear column 24C are smoothly connected through a left rear connecting portion 24K curved in an arc shape.

The right front column 24B, the right connecting beam 24F and the right rear column 24D are also formed integrally by performing bending work to, for example, a single cylindrical steel pipe or the like. Therefore the right front column 24B and the right connecting beam 24F are smoothly connected through a right front connecting portion 24L as a right connecting portion curved in an arc shape, and the right connecting beam 24F and the right rear column 24D are smoothly connected through a right rear connecting portion 24M curved in an arc shape.

The front connecting beam 24G is formed by, for example, a steel material in a U-letter in section (channel material), and both end sides thereof are respectively jointed to the left connecting beam 24E and the right connecting beam 24F by welding. The rear connecting beam 24H is formed by, for example, a cylindrical steel pipe, and both end sides thereof are respectively jointed to the left rear column 24C and the right rear column 24D by welding.

Figure 6:
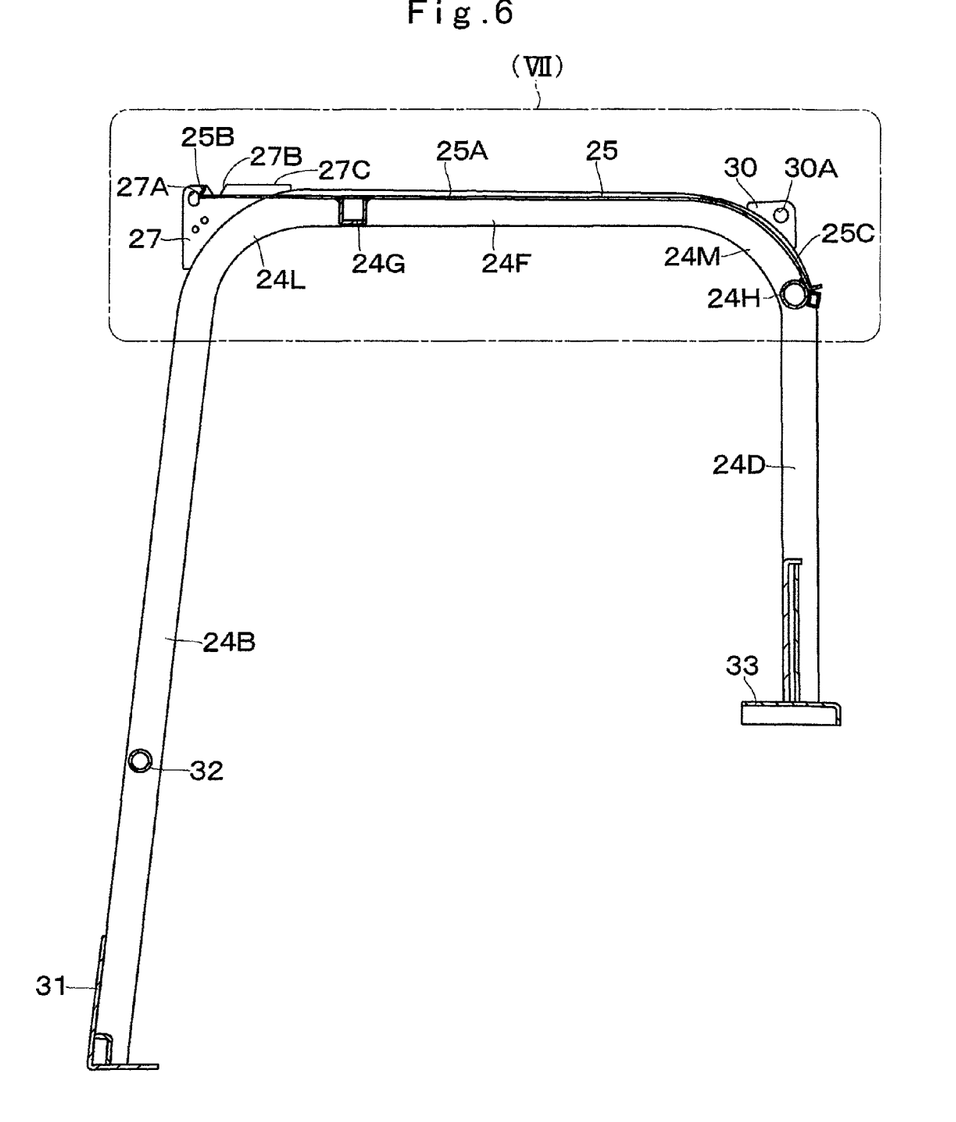
FIG. 6 is an enlarged cross section showing the canopy as viewed in the direction of arrows VI-VI in FIG. 4.

Indicated at 25 is the roof plate provided in the upper end side of the column 24, and the roof plate 25 is formed in a flat shape by using, for example, a thin steel plate material. The roof plate 24 extends in the front-rear direction in a state of being sandwiched between the left connecting beam 24E and the right connecting beam 24F to cover the upper side of the operator's seat 19 therewith. As shown in FIG. 6, the roof plate 25 is configured by a flat portion 25A positioned between the front connecting beam 24E and the rear connecting beam 24F to cover the operator's seat 19 from above, a bend portion 25B provided in the front end side of the flat portion 25A to extend in the left-right direction and project upward between the left front connecting portion 24J and the right front connecting portion 24L, and a curved portion 25C provided in the rear end side of the flat portion 25A to curve from the rear end side thereof toward the rear connecting beam 24H.

The flat portion 25A is formed in a substantially flat shape, and more specifically is inclined so that a section thereof overlapping the front connecting beam 24G in the upper-lower direction is the highest and the flat portion 25A is slightly lower in height as it is away in the front-rear direction from the section corresponding to the front connecting beam 24G. The flat portion 25A has a top surface 25A1 provided with a plurality of reinforcing portions 25A2 (for example, four) projecting upward from the top surface 25A1 to extend in the front-rear direction and to be separated from each other in the left-right direction.

On the other hand, the bend portion 25B provided in the front end side of the roof plate 25 is formed on the roof plate 25 (flat portion 25A) over an entire length (entire width) in the left-right direction by performing, for example, bending work to the front end side of the flat portion 25A. The bend portion 25B blocks the rain water, which has dropped on the top surface 25A1 of the flat portion 25A, in the front side of the roof plate 25, and acts as a rainwater pipe guiding the blocked rain water in the left-right direction. Thereby the roof plate 25 can suppress the rain water to drop down from the front end side of the roof plate 25.

Figure 8:
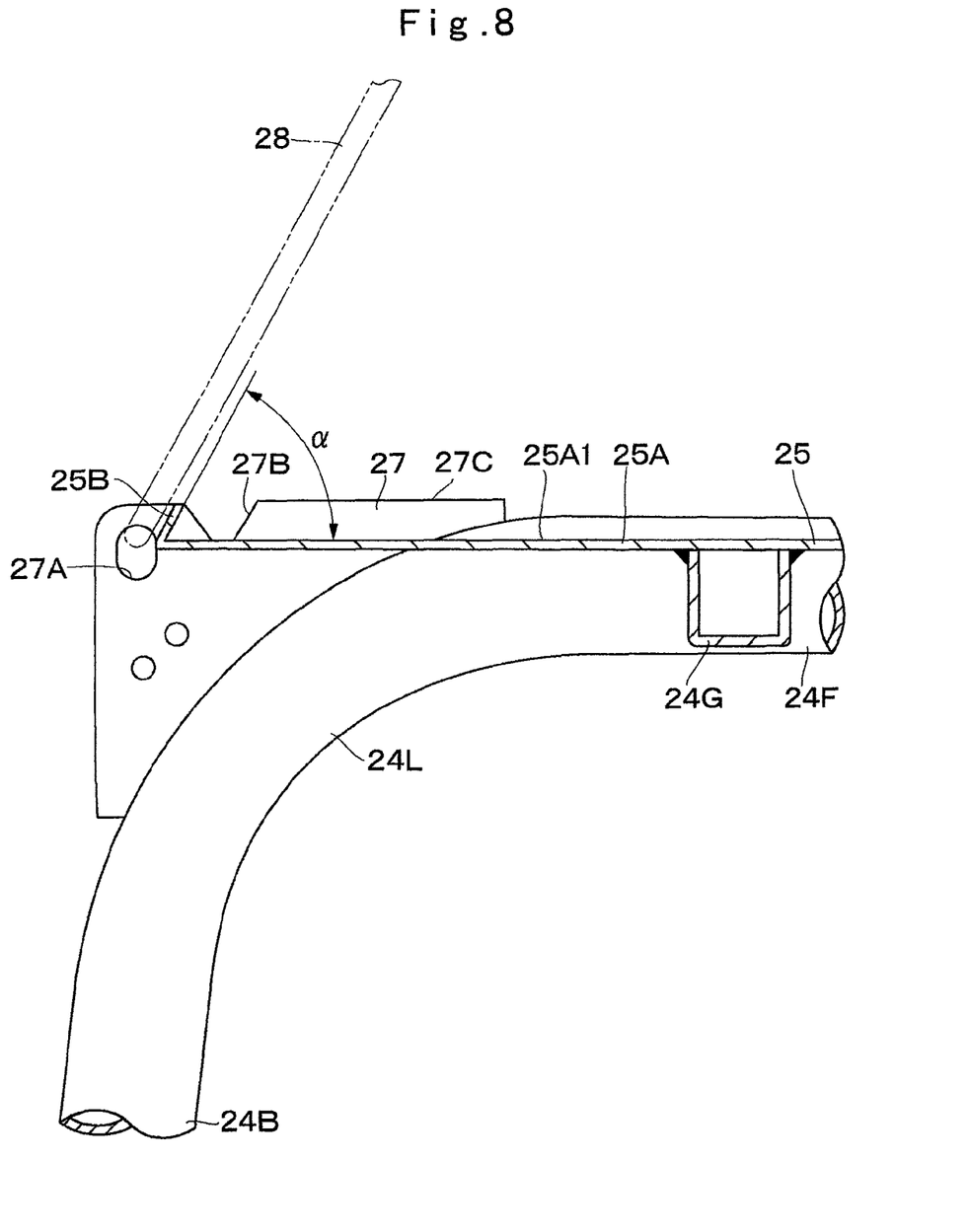
FIG. 8 is an enlarged cross section showing a (VIII) portion in FIG. 7, showing the right front column, the right connecting beam, the roof plate, and the right lifting bracket.

As shown in FIG. 8, the bend portion 25B is inclined obliquely backward to the flat portion 25A of the roof plate 25, and an angle α between the bend portion 25B and the top surface 25A1 of the flat portion 25A is set to be an acute angle. Therefore, for example, when the canopy 23 is lifted, a wire 28 hooked in lifting holes 26A and 27A of left and right front lifting brackets 26 and 27 to be described later can be prevented from interfering with the bend portion 25B.

Next, the front lifting brackets 26 and 27 sandwiching the front end side of the roof plate 25 from both sides in the left-right direction will be explained.

That is, designated at 26 is the left front lifting bracket as a left lifting bracket provided in a position of the left front connecting portion 24J between the left front column 24A and the left connecting beam 24E. Designated at 27 is the right front lifting bracket as a right lifting bracket provided in a position of the right front connecting portion 24L between the right front column 24B and the right connecting beam 24F. The left and right front lifting brackets 26 and 27 are respectively provided in the left front connecting portion 24J and the right front connecting portion 24L to sandwich the bend portion 25B of the roof plate 25 in the left-right direction.

The front lifting brackets 26 and 27 are respectively formed as a plate body in a substantially right triangle shape by a steel plate or the like, and a section corresponding to the inclined side of each is formed in a recess curved shape along each of the left and right front connecting portions 24J and 24L. The front lifting brackets 26 and 27 are jointed to the respective front connecting portions 24J and 24L by, for example, welding. Both end edges of the front end side of the roof plate 25 in the left-right direction, that is, both end edges of the front end side of the flat portion 25A in the left-right direction and both end edges of the bend portion 25B in the left-right direction are jointed to the respective side surfaces of the front lifting brackets 26 and 27 by welding.

Figure 7:
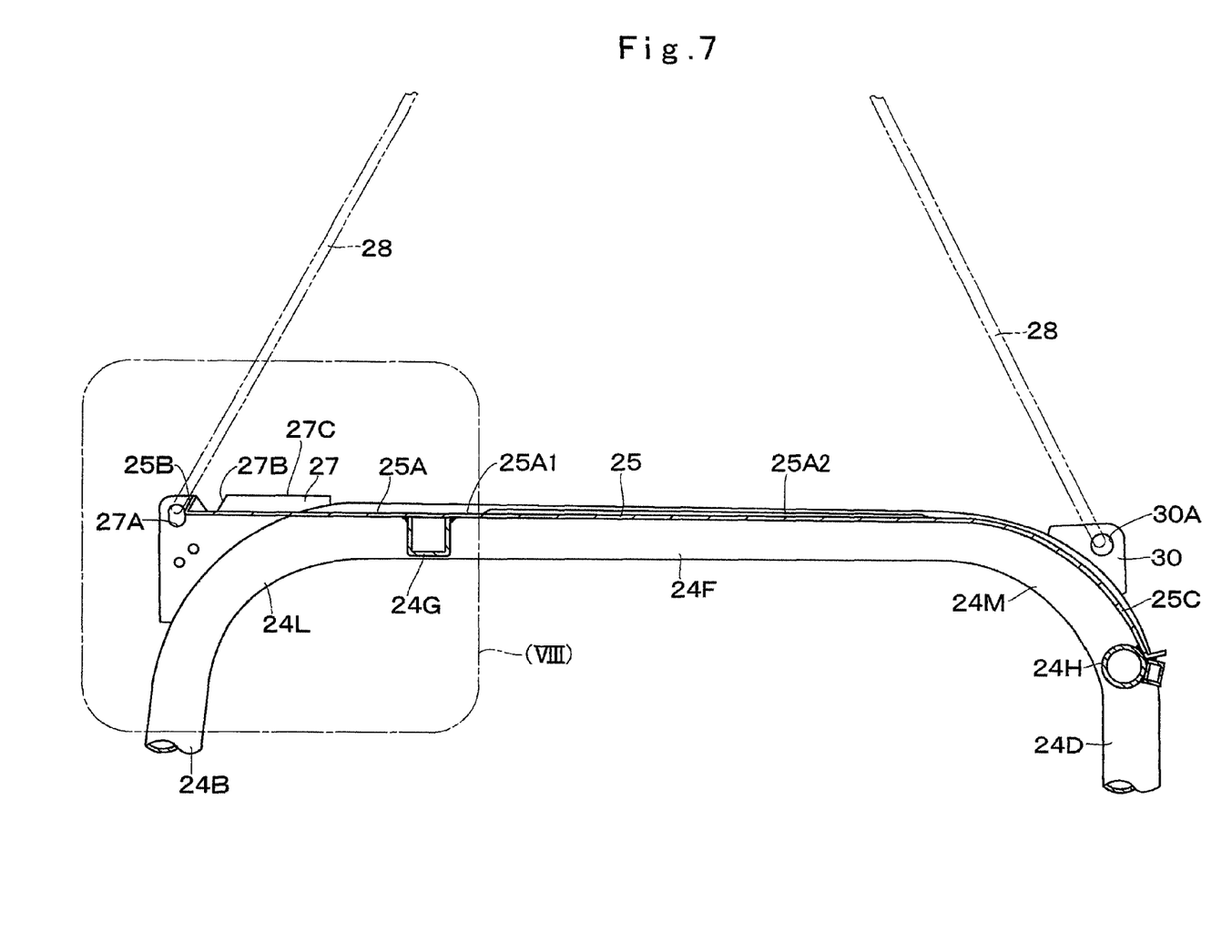
FIG. 7 is an enlarged cross section showing a (VII) portion in FIG. 6, showing a right front column, a right rear column, a right connecting beam, a roof plate, and a right lifting bracket.

The left and right front lifting brackets 26 and 27 are provided with the lifting holes 26A and 27A in sections thereof closer to the front side than the bend portion 25B. As shown in FIG. 7 and in FIG. 8, the wire 28 as the lifting tool, for example, at the time of lifting the canopy 23, is hooked in each of the lifting holes 26A and 27A.

The left and right front lifting brackets 26 and 27 are provided with discharging notches 26B and 27B in sections closer to the rear side than the lifting holes 26A and 27A and corresponding to the bend portion 25B. Each of the notches 26B and 27B is notched to open upward. That is, upper ends 26C and 27C of the left and right front lifting brackets 26 and 27 project upward more than the flat portion 25A of the roof plate 25. The notches 26B and 27B are formed by notching the front lifting brackets 26 and 27 in a V-letter or U-letter shape from the upper ends 26C and 27C toward the flat portion 25A of the roof plate 25. The respective notches 26B and 27B flow out the rain water blocked by the bend portion 25B to the left and right front connecting portions 24J and 24L and drop the rainwater down along the respective front columns 24A and 24B from the left and right front connecting portions 24J and 24L.

Figure 9:
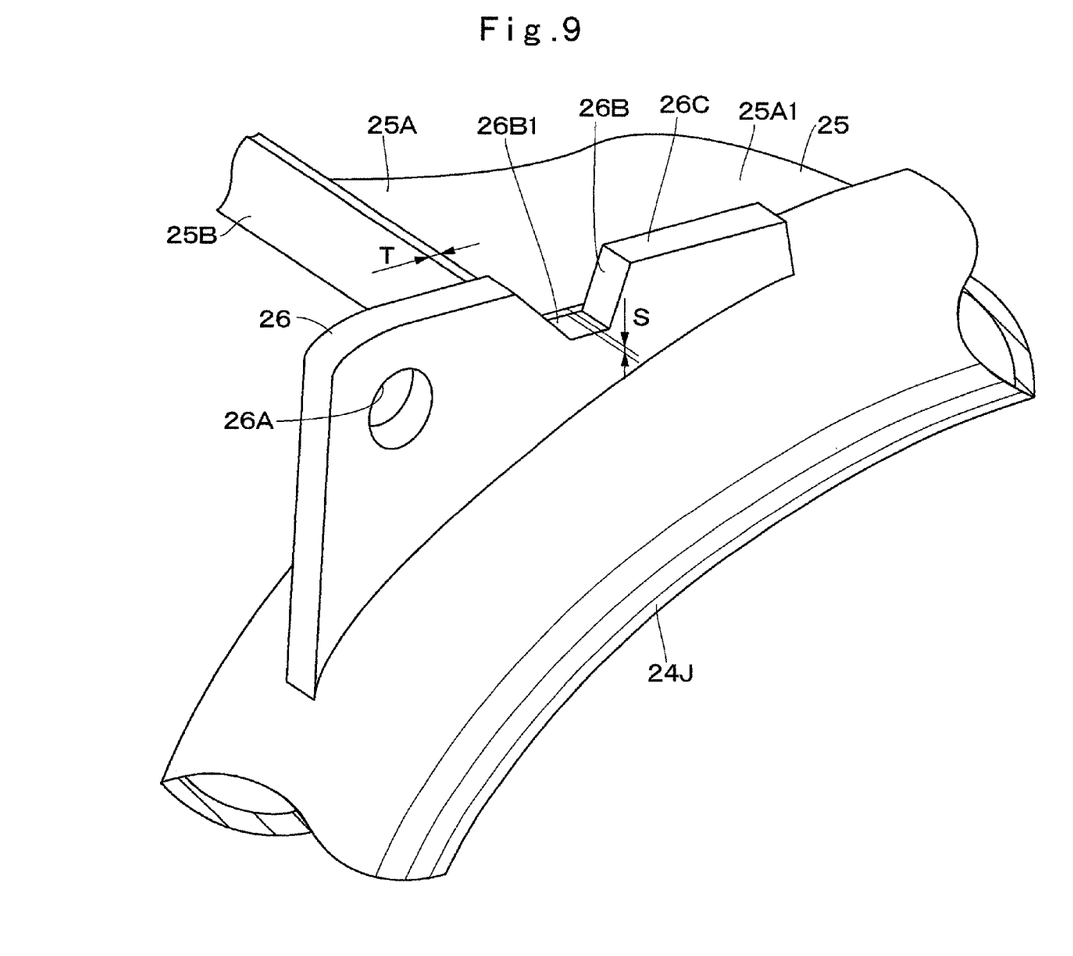
FIG. 9 is a perspective view corresponding to a (IX) portion in FIG. 4, showing a left connecting portion, a left lifting bracket, and the roof plate.
Figure 10:
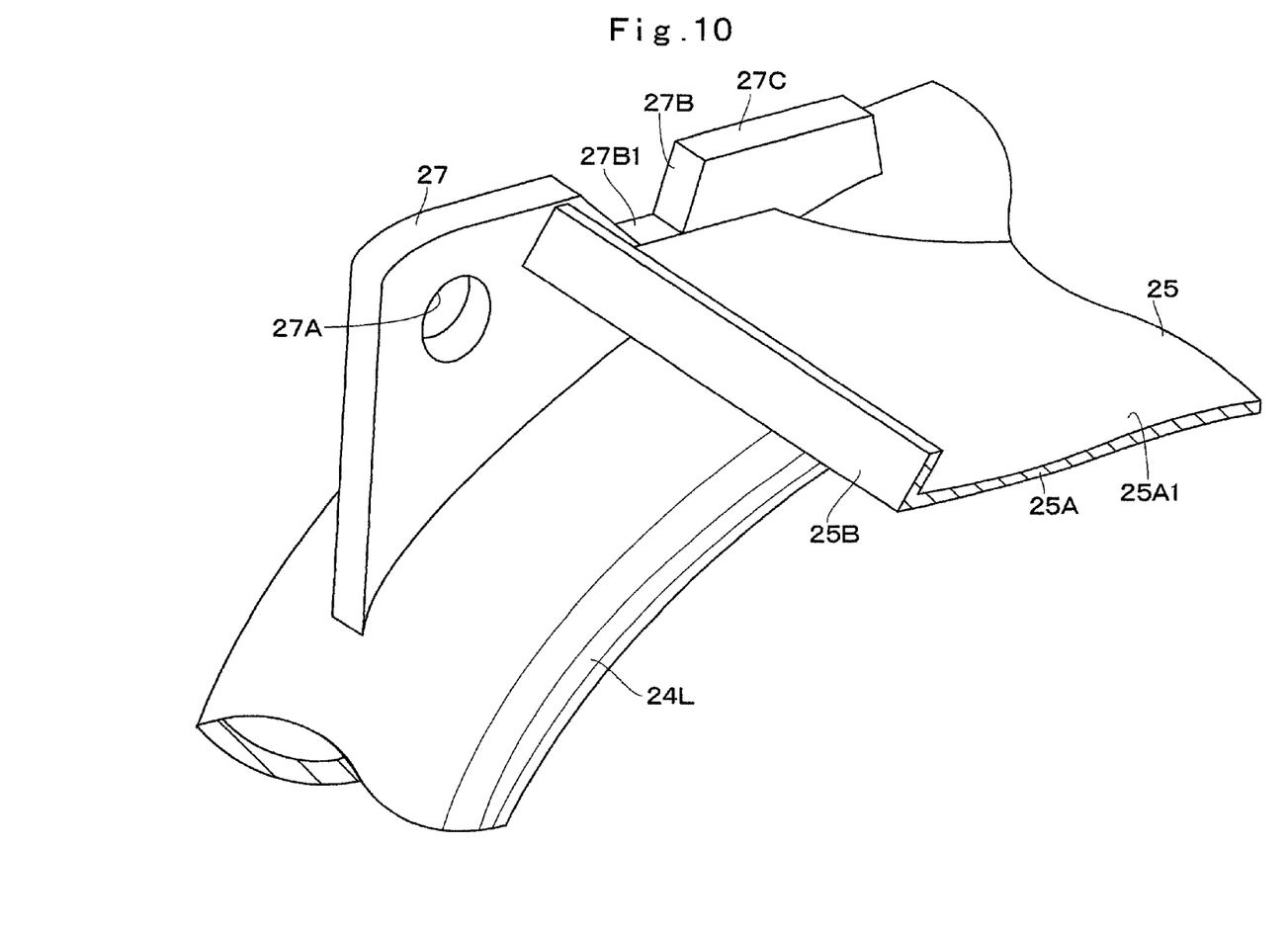
FIG. 10 is a perspective view corresponding to a (X) portion in FIG. 4, showing a right connecting portion, the right lifting bracket, and the roof plate.

Bottom portions 26B1 and 27B1 of the respective notches 26B and 27B are notched to the lower side position than the top surface 25A1 of the flat portion 25A in the roof plate 25. That is, as shown in FIG. 9 and in FIG. 10, the bottom portions 26B1 and 27B1 of the respective notches 26B and 27B are positioned to the lower side by a step dimension S than the top surface 25A1 of the flat portion 25A in the roof plate 25. Thereby, the rain water can stably flows to the left and right front connecting portions 24J and 24L and the left and right front columns 24A and 24B from the top surface 25A1 of the flat portion 25A in the roof plate 25 through the respective notches 26B and 27B.

The step dimension S between each of the bottom portions 26B1 and 27B1 of the respective notches 26B and 27B and the top surface 25A1 of the flat portion 25A is set to a value smaller than a plate thickness T of the roof plate 25 (S<T). This configuration prevents the rain water from flowing and dropping from the bottom portions 26B1 and 27B1 of the respective notches 26B and 27B to the operator's seat 19.

A left rear lifting bracket 29 is provided in the left rear connecting portion 24K. A right rear lifting bracket 30 is provided in the right rear connecting portion 24M. The rear lifting brackets 29 and 30 are respectively formed as a plate body in a substantially right triangle shape by a steel plate or the like, and are provided with lifting holes 29A and 30A at the substantial center position. As shown in FIG. 7 and in FIG. 8, the wire 28 or the like, for example, at the time of lifting the canopy 23 is hooked in the respective lifting holes 29A and 30A.

It should be noted that a front side platform member 31 is provided between a lower end side of the left front column 24A and a lower end side of the right front column 24B. The front side platform member 31 fixes the left front column 24A and the right front column 24B to the floor plate 16, and protects feet of an operator. A protection bar 32 is provided between the left front column 24A and the right front column 24B. The protection bar 32 protects the operator's seat 19 from the front side. A rear side platform member 33 is provided between a lower end side of the left rear column 24C and a lower end side of the right rear column 24D. The rear side platform member 33 fixes the left rear column 24C and the right rear column 24D to the operator's seat support base 18, and protects the operator's seat 19 from the rear side.

The hydraulic excavator 1 according to the present embodiment has the aforementioned configuration. In a case of performing an excavating operation of earth and sand by using the hydraulic excavator 1, an operator sits on the operator's seat 19 and controls the traveling control lever/pedal 21, thus self-traveling the hydraulic excavator 1 to the working side. When the operator controls the working control lever 20 in the working site, the upper revolving structure 3 is revolved and the working mechanism 4 is tilted up and down. Thus the excavating operation of earth and sand can be performed using the working mechanism 4.

Here, the hydraulic excavator 1 according to the present embodiment is configured to be provided with the bend portion 25B in the front end side of the roof plate 25 to extend in the left-right direction and project upward. Therefore the rain water having dropped on the roof plate 25 and having flown forward by the inclination of the top surface 25A1 of the flat portion 25A is blocked at the front end side of the roof plate 25 by the bend portion 25B. The plate-shaped left and right lifting brackets 26 and 27 are provided in the front end side of the roof plate 25 to sandwich the bend portion 25B from both sides in the left-right direction, and the respective left and right front lifting brackets 26 and 27 are provided with the discharging notches 26B and 27B.

Therefore, the rain water blocked by the bend portion 25B is guided in the left-right direction by the bend portion 25B, and flows through the notches 26B and 27B of the left and right front lifting brackets 26 and 27 to the left and right front connecting portions 24J and 24L. The rain water having flown to the left and right connecting portions 24J and 24L drops downward along the respective front columns 24A and 24B. This configuration can prevent the rain water from falling down to the front side of the operator's seat 19 from the front end side of the roof plate 25. As a result, it can be reduced for the rainwater to fall on the feet of the operator at working to improve working environments at raining.

Further, the plate-shaped front lifting brackets 26 and 27 for sandwiching the front end side of the roof plate 25 from both the sides in the left-right direction are configured to have the function of the hook for hooking the wire 28 at the time of lifting the canopy 23, for example. Thereby it is not necessary to provide another bracket or a hook member for lifting the front end side of the roof plate 25 in the left-right direction, to the upper portion front side of the canopy 23. Therefore, an increase in the number of components can be suppressed to achieve a reduction in manufacturing costs.

On the other hand, the upper ends 26C and 27C of the left and right front lifting brackets 26 and 27 project upward more than the flat portion 25A of the roof plate 25, and the notches 26B and 27B are formed by notching the lifting brackets 26 and 27 in a V-letter or U-letter shape from the upper ends 26C and 27C toward the flat portion 25A of the roof plate 25. The rain water blocked by the bend portion 25B of the roof plate 25 can stably flow through the respective notches 26B and 27B of the front lifting brackets 26 and 27 to the respective front columns 24A and 24B side.

According to the present embodiment, the bottom portions 26B1 and 27B1 of the notches 26B and 27B in the left and right front lifting brackets 26 and 27 are notched closer to the lower side position than the top surface 25A1 of the flat portion 25A in the roof plate 25. Thereby the rain water can stably flow to the left and right front columns 24A and 24B side from the top surface 25A1 of the flat portion 25A in the roof plate 25 through the notches 26B and 27B. As a result, it is possible to suppress the rainwater to remain on the top surface 25A1 of the flat portion 25A in the roof plate 25.

In this case, the step dimension S between each of the bottom portions 26B1 and 27B1 of the respective notches 26B and 27B and the top surface 25A1 of the flat portion 25A is set to a value smaller than the plate thickness T of the roof plate 25 (S<T). This configuration prevents the rain water from flowing and dropping from the bottom portions 26B1 and 27B1 of the respective notches 26B and 27B to the operator's seat 19 side.

Further, according to the present embodiment, the bend portion 25B is inclined obliquely backward to the flat portion 25A of the roof plate 25, and the angle α between the bend portion 25B and the flat portion 25A is set to be an acute angle. Therefore, as shown in FIG. 7 and in FIG. 8, for example, when the canopy 23 is lifted using the wire 28, the wire 28 hooked in the lifting holes 26A and 27A of the left and right front lifting brackets 26 and 27 can be prevented from interfering with the bend portion 25B to stably perform the lifting work of the canopy 23.

It should be noted that the aforementioned embodiment is explained by taking a case of providing the notches 26B and 27B to both of the left and right front lifting brackets 26 and 27 as an example. However, the present invention is not limited thereto, but, for example, a notch may be provided on one of the left and right front lifting brackets. In this case, for example, the top surface of the flat portion in the roof plate is preferably configured to be inclined to the front lifting bracket with the notch.

The aforementioned embodiment is explained by taking a case of providing the notches 26B and 27B of the left and right front lifting brackets 26 and 27 as the notches in a V-letter or U-letter shape to open upward, as an example. However, the present invention is not limited thereto, but, for example, the notch may be a notch in a rectangular or semi-arc shape, or a notch not opened upward (for example, a through hole). In other words, if only a notch can flow the rainwater from the top surface of the roof plate to the column side, the notch in various kinds of shapes may be used.

The aforementioned embodiment is explained by taking a case of mounting the wire 28 as the lifting tool at the time of lifting the canopy 23 to the lifting holes 26A and 27A of the front lifting brackets 26 and 27, as an example. However, the present invention is not limited thereto, but, for example, the canopy may be lifted by using a hook, a rope or the like as the lifting tool.

The aforementioned embodiment is explained by taking a case of forming the roof plate 25 by a steel plate, as an example. However, the present invention is not limited thereto, but, for example, the roof plate may be formed by a metallic plate other than the steel plate, a plate member of a synthetic resin or the like.

Further, the aforementioned embodiment exemplifies the hydraulic excavator of a crawler type as the construction machine equipped with the canopy 23. However, the present invention is not limited thereto, but, for example, the present invention may be widely applied to a construction machine equipped with a canopy, such as a hydraulic excavator of a wheel type, a hydraulic crane, a wheel loader, and the like.

DESCRIPTION OF REFERENCE NUMERALS

1: Hydraulic excavator (Construction machine)
2: Lower traveling structure (Vehicle body)
3: Upper revolving structure (Vehicle body)
19: Operator's seat
23: Canopy
24A: Left front column
24B: Right front column
24C: Left rear column
24D: Right rear column
24E: Left connecting beam
24F: Right connecting beam
24J: Left front connecting portion (Left connecting portion)
24L: Right front connecting portion (Right connecting portion)
25: Roof plate
25A: Flat portion
25A1: Top surface
25B: Bend portion
26: Left front lifting bracket (Left lifting bracket)
26A: Lifting hole
26B: Notch
26B1: Bottom portion
26C: Upper end
27: Right front lifting bracket (Right lifting bracket)
27A: Lifting hole
27B: Notch
27B1: Bottom portion
27C: Upper end

The invention claimed is:
1. A construction machine comprising:
an auto-motive vehicle body (2, 3) in a front portion side of which a working mechanism (4) is provided;
an operator's seat (19) provided in said vehicle body (2, 3) for an operator to sit on; and
a canopy (23) provided to rise in said vehicle body (2, 3) to cover an upper side of said operator's seat (19),
wherein said canopy (23) comprises:
a left front column (24A) provided to rise in a left front side of said operator's seat (19);
a right front column (24B) provided to rise in a right front side of said operator's seat (19);
a left rear column (24C) provided to rise in a left rear side of said operator's seat (19);
a right rear column (24D) provided to rise in a right rear side of said operator's seat (19);
a left connecting beam (24E) extending in the front-rear direction to connect said left front column (24A) and said left rear column (24C);
a right connecting beam (24F) extending in the front-rear direction to connect said right front column (24B) and said right rear column (24D); and
a roof plate (25) provided between said left connecting beam (24E) and said right connecting beam (24F) to extend in the front-rear direction for covering the upper side of said operator's seat (19), characterized in that;
a bend portion (25B) is provided in a front end side of said roof plate (25) to extend in the left-right direction and project upward between a left connecting portion (24J) connecting said left front column (24A) and said left connecting beam (24E) and a right connecting portion (24L) connecting said right front column (24B) and said right connecting beam (24F),
plate-shaped lifting brackets (26, 27) are respectively provided in a position of said left connecting portion (24J) and in a position of said right connecting portion (24L) to sandwich said bend portion (25B) from both sides in the left-right direction, and
a discharging notch (26B, 27B) is provided in at least one of said left lifting bracket (26) and said right lifting bracket (27) to a section thereof corresponding to said bend portion (25B) of said roof plate (25).
2. A construction machine according to claim 1, wherein an upper end (26C, 27C) of said lifting bracket (26, 27) projects upward more than a flat portion (25A) of said roof plate (25), and said notch (26B, 27B) is formed by notching said lifting bracket (26, 27) from said upper end (26C, 27C) thereof to said flat portion (25A) of said roof plate (25).

3. A construction machine according to claim 1, wherein a bottom portion (26B1, 27B1) of said notch (26B, 27B) is notched to the lower side position than a top surface (25A1) of said flat portion (25A) in said roof plate (25).

4. A construction machine according to claim 1, wherein said left lifting bracket (26) and said right lifting bracket (27) are provided with lifting holes (26A, 27A) for mounting a lifting tool (28) in positions thereof closer to a front side than said bend portion (25B), said bend portion (25B) is inclined obliquely backward to said roof plate (25), and an angle ($\alpha$) between said bend portion (25B) and said flat portion (25A) of said roof plate (25) is set to be an acute angle.

* * * * *